United States Patent
Huang et al.

(10) Patent No.: US 9,408,135 B2
(45) Date of Patent: Aug. 2, 2016

(54) METHOD AND DEVICE FOR NOTIFYING WIRELESS ACCESS POINT SERVICE VIRTUAL PROVIDER

(71) Applicant: Huawei Technologies Co., Ltd., Shenzhen (CN)

(72) Inventors: Kaidi Huang, Shenzhen (CN); Xuehuan Wang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/657,079

(22) Filed: Mar. 13, 2015

(65) Prior Publication Data

US 2015/0195772 A1   Jul. 9, 2015

Related U.S. Application Data (63) Continuation of application No. PCT/CN2013/077041, filed on Jun. 9, 2013.

(30) Foreign Application Priority Data

Sep. 13, 2012   (CN) .......................... 2012 1 0338359

(51) Int. Cl.
*H04W 48/14* (2009.01)
*H04W 48/20* (2009.01)
*H04W 48/08* (2009.01)
(Continued)

(52) U.S. Cl.
CPC .............. *H04W 48/14* (2013.01); *H04W 48/20* (2013.01); *H04W 48/08* (2013.01); *H04W 48/18* (2013.01); *H04W 88/10* (2013.01)

(58) Field of Classification Search
CPC .............................. H04W 48/14; H04W 48/20
See application file for complete search history.

(56) References Cited

U.S. PATENT DOCUMENTS

2007/0232316 A1   10/2007  Reda et al.
2012/0209934 A1*  8/2012  Smedman ..................... 709/208
(Continued)

FOREIGN PATENT DOCUMENTS

CN        1852304 A     10/2006
CN      101568162 A     10/2009
(Continued)

OTHER PUBLICATIONS

"Wi-Fi Roaming-Building on ANDSF and HOTSPOT2.0", pp. 1-45, www.tmcnet.com/redir/?u=1006057 (Feb. 27, 2012).
(Continued)

*Primary Examiner* — Leon Flores
(74) *Attorney, Agent, or Firm* — Leydig, Voit & Mayer, Ltd.

(57) ABSTRACT

In embodiments, a UE notifies an AP of information about a home operator of the UE; and the AP determines whether the home operator of the UE uses a hotspot virtualization technology on the AP, and if the home operator uses the hotspot virtualization technology on the AP, sends the information about the home operator of the UE as information about the AP access service operator to the UE, so that in a case in which the home operator of the UE and the AP access service operator are different, the UE considers the AP access service operator as the home operator of the UE and therefore preferentially selects a network of the home operator to access a communications network by using the AP.

4 Claims, 4 Drawing Sheets (51) Int. Cl.
*H04W 48/18* (2009.01)
*H04W 88/10* (2009.01)

(56) References Cited

U.S. PATENT DOCUMENTS

2013/0039275 A1* 2/2013 Patil et al. ............... 370/328
2013/0051303 A1* 2/2013 Huang et al. ............ 370/312

FOREIGN PATENT DOCUMENTS

| CN | 102573104 A | 7/2012 |
|---|---|---|
| JP | 4591263 B2 | 12/2010 |
| WO | WO 2012041755 A1 | 4/2012 |

OTHER PUBLICATIONS

"IEEE P802.11 Wireless LANs", Revised ANQP text, IEEE 802.11-11/1116r4, pp. 1-30, (Sep. 2011).

"Key Issues for WLAN_NDS", 3GPP TSG SA WG2 Meeting #91, Kyoto, Japan, TD S2-122190, pp. 1-2, $3^{rd}$ Generation Partnership Project, Valbonne, France (May 21-25, 2012).

"Wi-Fi Certified Passpoint™ (Release 1) Deployment Guidelines", Wi-Fi Alliance Hotspot 2.0 Technical Task Group, Version 1.0, pp. 1-26, (Oct. 2012).

Wi-F1 Certified Passpoint Architecture for Public Access, Aruba White Paper, pp. 1-15, (Jun. 29, 2012).

* cited by examiner

METHOD AND DEVICE FOR NOTIFYING WIRELESS ACCESS POINT SERVICE VIRTUAL PROVIDER

CROSS-REFERENCE

This application is a continuation of International Patent Application No. PCT/CN2013/077041, filed on Jun. 9, 2013, which claims priority to Chinese Patent Application No. 201210338359.0, filed on Sep. 13, 2012, both of which are hereby incorporated by reference in their entireties.

TECHNICAL FIELD

The present invention relates to wireless communications networks, and in particular, to a method and device for notifying a wireless access point service virtual provider.

BACKGROUND

A Hotspots virtualization technology, also referred to as a hotspot virtualization technology, refers to that a virtual network technology, such as a virtual local area network (Virtual Local Area Network, VLAN) or a virtual private network (Virtual Private Network, VPN), is used to virtualize a network at layer 3 to logically classify stations connect to a same air interface into different groups according to different operators, for management and communication. The Hotspots virtualization technology can implement sharing of a same service set identifier (Service Set Identifier, SSID) network resource among different operators. A service of a user of each operator is returned to a network of a home operator of the user by using a network of a Hotspots operator by using a tunneling technology. Therefore, it may be considered that the service of the user is directly provided by the network of the home operator of the user.

The Hotspots virtualization technology has the following advantages:

(1) the home operator may configure policies (such as IP address allocation, firewall configuration, and content filtering).

(2) a broadcast domain is virtualized, and stations communicate only within a group.

(3) the home operator is responsible for the Proxy Address Resolution Protocol (Proxy ARP) and proxy neighbor discovery.

Compared with a practice of allocating different SSIDs to different operators, the Hotspots virtualization technology has the following advantages:

(1) scalability is higher, and it is unnecessary to configure a new SSID on each Hotspot for each new operator.

(2) there are fewer air interface overheads, and sending of beacon frames and probe frames is reduced.

(3) a trend of centralized development of existing networks is met.

A main advantage of the hotspot virtualization technology lies in that the user may directly enjoy a same service as in the network of the home operator by using another network. That is, the user considers an access point in Hotspots virtualization as an access point provided by the home operator.

In the existing virtual Hotspot2.0 technology, when an access point (AP) connected to networks of multiple operators is provided by other operators than a home operator of a user equipment (UE), and the home operator of the UE uses the hotspot virtualization technology on the AP, the UE may consider that the AP is provided by the home operator of the UE in this case, but in the prior art, the UE cannot identify this situation, and therefore cannot preferentially select the network of the home operator of the UE to access a communications network by using the AP.

SUMMARY

Embodiments of the present invention provide a method for notifying a wireless access point service virtual provider, an access point, and a user equipment, to notify the UE of a wireless access point service virtual provider.

To achieve the objectives, the embodiments of the present invention use the following technical solutions:

According to a first aspect, an embodiment of the present invention provides a method for notifying a wireless access point service virtual provider, including:

receiving, by an access point AP, a query message sent by a user equipment UE, where the query message carries an indication of information about a home operator of the UE; and sending, by the AP, a response message to the UE, where the response message carries an indication of information about the AP access service operator, where if the home operator of the UE uses a hotspot virtualization technology on the AP, the information about the AP access service operator is the information about the home operator of the UE, so that the UE preferentially selects a network of the home operator to access a communications network by using the AP.

With reference to the first aspect, in a first possible implementation manner, before the receiving, by an access point AP, a query message sent by a user equipment UE, the method further includes: sending, by the AP, a notification message to the user equipment UE, where the notification message indicates that the AP is connected to networks of multiple operators.

With reference to the first possible implementation manner of the first aspect, in a second possible implementation manner, the notification message further indicates that, among the operators accessible by using the AP, at least one operator uses the hotspot virtualization technology on the AP.

With reference to the second possible implementation manner of the first possible implementation manner of the first aspect, in a third possible implementation manner, that the notification message further indicates that, among the operators accessible by using the AP, at least one operator uses the hotspot virtualization technology on the AP, is specifically that: the indication is implemented by adding a virtualization technology indication field to a beacon Beacon frame or a probe response Probe Response frame.

With reference to the first aspect, and the foregoing three possible implementation manners of the first aspect, in a fourth possible implementation manner, before the sending, by the AP, a response message to the UE, the method further includes: forwarding, by the AP, the query message to an Access Network Query Protocol ANQP server, and receiving a response message sent by the ANQP server.

According to a second aspect, an embodiment of the present invention provides a method for notifying a wireless access point service virtual provider, including:

sending, by a user equipment UE, a query message to an access point AP, where the query message carries an indication of information about a home operator of the UE;

receiving, by the UE, a response message sent by the AP, where the response message carries an indication of information about the AP access service operator, where if the home operator of the UE uses a hotspot virtualization technology on the AP, the information about the AP access service operator is the information about the home operator of the UE; and preferentially selecting, by the UE, a network of the home operator to access a communications network by using the AP.

With reference to the second aspect, in a first possible implementation manner, before the sending, by a user equipment UE, a query message to an access point AP, the method further includes: receiving, by the UE, a notification message sent by the AP, where the notification message indicates that the AP is connected to networks of multiple operators.

With reference to the first possible implementation manner of the second aspect, in a second possible implementation manner, the notification message further indicates that, among the operators accessible by using the AP, at least one operator uses the hotspot virtualization technology on the AP.

With reference to the second possible implementation manner of the first possible implementation manner of the second aspect, in a third possible implementation manner, that the notification message further indicates that, among the operators accessible by using the AP, at least one operator uses the hotspot virtualization technology on the AP, is specifically that: the indication is implemented by adding a virtualization technology indication field to a beacon Beacon frame or a probe response Probe Response frame.

According to a third aspect, an embodiment of the present invention provides a method for notifying a wireless access point service virtual provider, including:

receiving, by a user equipment UE, an indication message sent by an access point AP, where the indication message indicates operators accessible by the UE by using the AP, and indicates whether the operators use a hotspot virtualization technology on the AP; and when a home operator of the UE uses the hotspot virtualization technology on the AP, preferentially selecting, by the UE, a network of the home operator to access a communications network by using the AP.

With reference to the third aspect, in a first possible implementation manner, before the receiving, by a user equipment UE, an indication message sent by an access point AP, the method further includes: sending, by the UE, a query message to the AP, where the query message is used to query the operators accessible by using the AP.

With reference to the third aspect, in a second possible implementation manner, before the receiving, by a user equipment UE, an indication message sent by an access point AP, the method further includes: receiving, by the UE, a notification message sent by the AP, where the notification message indicates that, among the operators accessible by using the AP, at least one operator uses the hotspot virtualization technology on the AP.

With reference to the third aspect, in a third possible implementation manner, that the indication message indicates operators accessible by the UE by using the AP, and indicates whether the operators use a hotspot virtualization technology on the AP, is specifically that: the indication is implemented by adding a network description field Network Description Field to an access network realm list NAI Realm List information element or a core network realm list Core Network Realm List information element.

According to a fourth aspect, an embodiment of the present invention provides an access point AP, including:

a receiver, configured to receive a query message sent by a user equipment UE, where the query message carries an indication of information about a home operator of the UE; and a first transmitter, configured to send a response message to the UE, where the response message carries an indication of information about the AP access service operator, where if the home operator of the UE uses a hotspot virtualization technology on the AP, the information about the AP access service operator is the information about the home operator of the UE, so that the UE preferentially selects a network of the home operator to access a communications network by using the AP.

With reference to the fourth aspect, in a first possible implementation manner, the AP further includes: a second transmitter, configured to send a notification message to the UE, where the notification message indicates that the AP is connected to networks of multiple operators.

With reference to the first possible implementation manner of the fourth aspect, in a second possible implementation manner, the notification message further indicates that, among the operators accessible by using the AP, at least one operator uses the hotspot virtualization technology on the AP.

According to a fifth aspect, an embodiment of the present invention provides a user equipment UE, including:

a transmitter, configured to send a query message to an access point AP, where the query message carries an indication of information about a home operator of the UE;

a first receiver, configured to receive a response message sent by the AP, where the response message carries an indication of information about the AP access service operator, where if the home operator of the UE uses a hotspot virtualization technology on the AP, the information about the AP access service operator is the information about the home operator of the UE; and a processor, configured to preferentially select a network of the home operator of the UE to access a communications network by using the AP.

With reference to the fifth aspect, in a first possible implementation manner, the UE further includes: a second receiver, configured to receive a notification message sent by the AP, where the notification message indicates that the AP is connected to networks of multiple operators.

With reference to the first possible implementation manner of the fifth aspect, in a second possible implementation manner, the notification message further indicates that, among the operators accessible by using the AP, at least one operator uses the hotspot virtualization technology on the AP.

According to a sixth aspect, an embodiment of the present invention provides a user equipment UE, including:

a first receiver, configured to receive an indication message sent by an access point AP, where the indication message indicates operators accessible by the UE by using the AP, and indicates whether the operators use a hotspot virtualization technology on the AP; and a processor, configured to preferentially select, when a home operator of the UE uses the hotspot virtualization technology on the AP, a network of the home operator of the UE to access a communications network by using the AP.

With reference to the fifth aspect, in a first possible implementation manner, the UE further includes: a transmitter, configured to send a query message to the AP, where the query message is used to query the operators accessible by using the AP.

With reference to the fifth aspect, in a second possible implementation manner, the UE further includes: a second receiver, configured to receive a notification message sent by the AP, where the notification message indicates that, among the operators accessible by using the AP, at least one operator uses the hotspot virtualization technology on the AP.

In the embodiments, a UE notifies an AP of information about a home operator of the UE; and the AP determines whether the home operator of the UE uses a hotspot virtualization technology on the AP, and if the home operator uses the hotspot virtualization technology on the AP, sends the information about the home operator of the UE as information about the AP access service operator to the UE, so that in a case in which the home operator of the UE and the AP access service operator are different, the UE considers the AP access service operator as the home operator of the UE and therefore preferentially selects a network of the home operator to access a communications network by using the AP.

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as: a Global System for Mobile Communications (GSM) system, a Code Division Multiple Access (CDMA) system, a Wideband Code Division Multiple Access (WCDMA) system, a general packet radio service (GPRS) system, a Long Term Evolution (LTE) system, an LTE Frequency Division Duplex (FDD) system, an LTE Time Division Duplex (TDD), a Universal Mobile Telecommunications System (UMTS), a Worldwide Interoperability for Microwave Access (WiMAX) communications system, or a microwave communications system.

Embodiment 1

Figure 1:
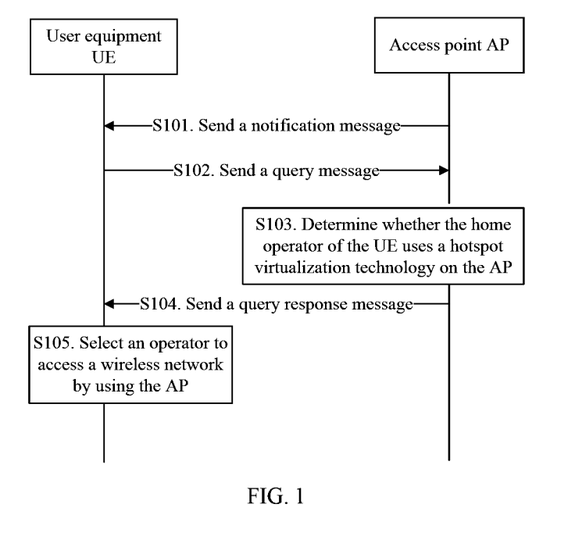
FIG. 1 is a flowchart of a method for notifying a wireless access point service virtual provider according to an embodiment of the present invention.

FIG. 1 shows a schematic flowchart of a method for notifying a wireless access point service virtual provider according to an embodiment of the present invention. As shown in FIG. 1, the method includes:

Step 101: An access point (Access Point, AP) sends a notification message to a user equipment (User Equipment, UE).

The notification message indicates that the AP supports networks of multiple operators. The access point AP is leased by the multiple operators, and the UE may access the networks of the multiple operators by using the AP. For example, a home operator of the AP is operator A, a home operator of the user equipment UE is operator B, and the AP is also leased by operators B and C when the AP belongs to operator A; therefore, the AP sends a notification message to the UE, indicating that the AP is connected to networks of operators A, B, and C, and the UE may access the networks of operators A, B, and C by using the AP. The notification message may further indicate that, among the operators supported by the AP, at least one operator uses a hotspot virtualization technology on the AP.

The notification message may be sent by using a beacon Beacon frame or a probe response Probe Response frame to the UE by broadcast, multicast, or unicast. The AP may add a multi-operator indication field to the Beacon frame or Probe Response frame, to indicate that the AP supports the networks of the multiple operators, as shown in Table 1:

TABLE 1

| Element ID | Length | OI | Type | Hotspot Configuration |
|---|---|---|---|---|

The Element ID is a special information element identifier of a vendor, the OI is an OI number of the Wireless Cable Association, the Type is a Type number allocated by the Wireless Cable Association to the Hotspots 2.0 program, and the Hotspot Configuration is related configuration information of the Hotspot. A structure of the Hotspot Configuration field is shown in Table 2:

TABLE 2

| DGAF Disabled | MOCN | Reserved |
|---|---|---|

When the DGAF Disabled field is set to 1, it indicates whether a downstream group addressed forwarding function is disabled on the Hotspot; and when the MOCN field is set to 1, it indicates that the AP supports the networks of the multiple operators, that is, the AP is connected to the networks of the multiple operators.

The AP may add a virtualization technology indication field to the structure of the Hotspot Configuration field to indicate that, among the operators supported by the AP, at least one operator uses the hotspot virtualization technology on the AP, as shown in Table 3:

TABLE 3

| DGAF Disabled | MOCN | Hotspot Virtualization | Reserved |
|---|---|---|---|

Step 102: The AP receives a query message sent by the UE, where the query message carries an indication of information about a home operator of the UE.

The query message is used by the UE to query, according to the home operator of the UE, the AP for information about the operators accessible by using the AP. The query message carries the information about the home operator of the UE, where the information about the home operator of the UE may be a name or number of an operator, or the like. In this embodiment, the AP may directly receive the query message sent by the UE, that is, step 101 may be omitted.

Step 103: The AP determines whether the home operator of the UE uses a hotspot virtualization technology on the AP.

Step 104: The AP sends a response message to the UE.

The response message carries support information and authentication information, where the support information indicates which networks of operators the UE may access by using the AP, and the authentication information indicates a corresponding Extensible Authentication Protocol (Extensible Authentication Protocol, EAP) authentication mode.

The response message may further carry information about the AP access service operator. If the home operator of the UE uses the hotspot virtualization technology on the AP, the information is the information about the home operator of the UE; otherwise, the information is the information about the AP access service operator. The AP access service operator is an operator that provides and operates the AP, such as operator A in step 101.

Step 105: If the home operator of the UE uses the hotspot virtualization technology on the AP, the UE preferentially selects a network of the home operator to access a communications network by using the AP.

In this case, the UE considers the AP access service operator as the home operator of the UE, and therefore preferentially selects the network of the home operator to access the communications network by using the AP.

In this embodiment, a UE notifies an AP of information about a home operator of the UE; and the AP determines whether the home operator of the UE uses a hotspot virtualization technology on the AP, and if the home operator uses the hotspot virtualization technology on the AP, sends the information about the home operator of the UE as information about the AP access service operator to the UE, so that in a case in which the home operator of the UE and the AP access service operator are different, the UE considers the AP access service operator as the home operator of the UE and therefore preferentially selects a network of the home operator to access a communications network by using the AP.

Embodiment 2

Figure 2:
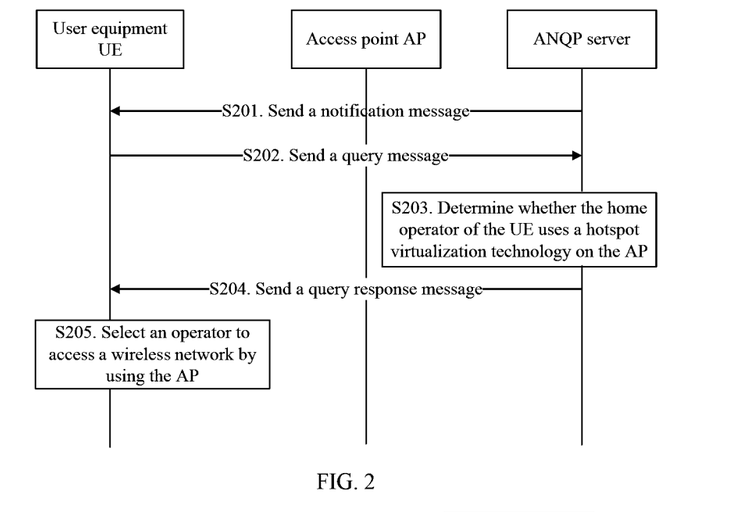
FIG. 2 is a flowchart of another method for notifying a wireless access point service virtual provider according to an embodiment of the present invention.

FIG. 2 shows a schematic flowchart of a method for notifying a wireless access point service virtual provider according to an embodiment of the present invention. As shown in FIG. 2, steps of Embodiment 2 are basically the same as those in Embodiment 1, and a difference lies in that: in Embodiment 2, after an AP receives a query message sent by a UE, the AP forwards the query message to an Access Network Query Protocol (Access Network Query Protocol, ANQP) server, and the ANQP server determines whether a home operator of the UE uses a hotspot virtualization technology on the AP, and sends a response message to the UE by using the AP.

In this embodiment, a UE notifies an ANQP server of information about a home operator of the UE by using an AP; and the ANQP server determines whether the home operator of the UE uses a hotspot virtualization technology on the AP, and if the home operator uses the hotspot virtualization technology on the AP, sends the information about the home operator of the UE as information about the AP access service operator to the UE, so that in a case in which the home operator of the UE and the AP access service operator are different, the UE considers the AP access service operator as the home operator of the UE and therefore preferentially selects a network of the home operator to access a communications network by using the AP.

Embodiment 3

Figure 3:
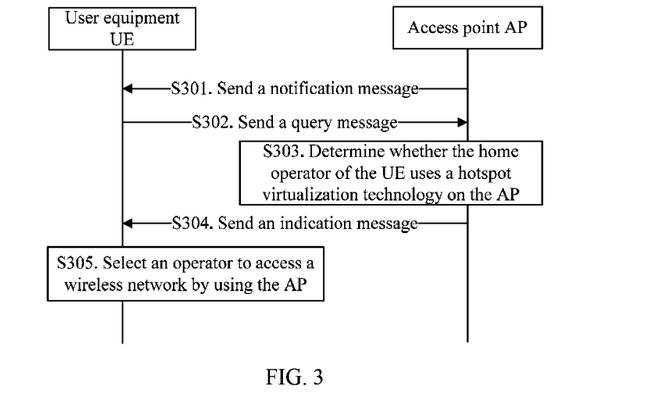
FIG. 3 is a flowchart of another method for notifying a wireless access point service virtual provider according to an embodiment of the present invention.

Step 301: An access point (Access Point, AP) sends a notification message to a user equipment (User Equipment, UE).

The notification message indicates that the AP supports networks of multiple operators. The access point AP is leased by the multiple operators, and the UE may access the networks of the multiple operators by using the AP. For example, a home operator of the AP is operator A, a home operator of the user equipment UE is operator B, and the AP is also leased by operators B and C when the AP belongs to operator A; therefore, the AP sends a notification message to the UE, indicating that the AP is connected to core networks of operators A, B, and C, and the UE may access the networks of operators A, B, and C by using the AP. The notification message may further indicate that, among the operators supported by the AP, at least one operator uses a hotspot virtualization technology on the AP.

The notification message may be sent by using a Beacon frame or a Probe Response frame to the UE by broadcast, multicast, or unicast. The AP may add a multi-operator indication field to the Beacon frame or Probe Response frame, to indicate that the AP supports the networks of the multiple operators, as shown in Table 4:

TABLE 4

| Element ID | Length | OI | Type | Hotspot Configuration |
|---|---|---|---|---|

The Element ID is a special information element identifier of a vendor, the OI is an OI number of the Wireless Cable Association, the Type is a Type number allocated by the Wireless Cable Association to the Hotspots 2.0 program, and the Hotspot Configuration is related configuration information of the Hotspot. A structure of the Hotspot Configuration field in Table 4 is shown in Table 5:

TABLE 5

| DGAF Disabled | MOCN | Reserved |
|---|---|---|

When the DGAF Disabled field is set to 1, it indicates whether a downstream group addressed forwarding function is disabled on the Hotspot; and when the MOCN field is set to 1, it indicates that the AP supports the networks of the multiple operators.

The AP may add a virtualization technology indication field to the structure of the Hotspot Configuration field to indicate that, among the operators supported by the AP, at least one operator uses the hotspot virtualization technology on the AP, as shown in Table 6:

TABLE 6

| DGAF Disabled | MOCN | Hotspot Virtualization | Reserved |
|---|---|---|---|

Step 302: The AP receives a query message sent by the UE, where the query message carries an indication of information about a home operator of the UE.

The query message is used by the UE to query which networks of operators may be accessed by using the AP, and also notifies the AP of the information about the home operator of the UE, where the information about the home operator of the UE includes an operator name. In this embodiment, the AP may directly receive the query message sent by the UE, that is, step 301 may be omitted, and only step 302 to step 305 are performed in this embodiment.

Step 303: The AP determines whether the home operator of the UE uses a hotspot virtualization technology on the AP.

Step 304: The AP sends an indication message to the UE.

The indication message carries support information and authentication information, where the support information indicates which networks of operators the UE may access by using the AP, and the authentication information indicates a corresponding Extensible Authentication Protocol (Extensible Authentication Protocol, EAP) authentication mode.

The indication message carries network description information. That is, when the AP notifies the UE which networks of operators the UE may access by using the AP, and notifies the UE of a corresponding EAP authentication mode, the AP also indicates whether the home operator of the UE uses the hotspot virtualization technology on the AP. The AP may add a network description field Network Description Field information element to a network description access network realm list NAI Realm List information element or a core network realm list Core Network Realm List information element to implement the indication. The indication of whether the home operator of the UE uses the hotspot virtualization technology on the AP is shown in Table 7:

TABLE 7

| NAI Realm Data Field Length | NAI Realm Encoding | NAI Realm Length | NAI Realm | EAP Method Count | EAP Method #1 (optional) | EAP Method #2 (optional) | ... | EAP Method #n (optional) | Network Description |
| --- | --- | --- | --- | --- | --- | --- | --- | --- | --- | or shown in Table 8:

TABLE 8

| Realm Count | Core Network Realm Data #1 | Core Network Realm Data #2 (optional) | ... | Core Network Realm Data #n (optional) |
| --- | --- | --- | --- | --- |

The Realm Encoding field indicates an encoding mode of the NAI Realm field; the EAP Method Count indicates the number of EAP authentication modes supported by the Realm; and the EAP Method indicates corresponding authentication mode information. Network Description is a network description field, and carries description information about the Realm.

A structure of the Network Description field in Table 7 is shown in Table 9:

TABLE 9

| Hotspots Virtualization | Reserved |
| --- | --- |

When the Hotspots Virtualization field is set to 1, it indicates that the operator uses the hotspot virtualization technology on the AP.

A structure of the Core Network Realm Data #1 field in Table 8 is shown in Table 10:

The Realm Encoding field indicates an encoding mode of the NAI Realm field; the EAP Method Count indicates the number of EAP authentication modes supported by the Realm; and the EAP Method indicates corresponding authentication mode information. Network Description is a network description field, and carries description information about the Realm.

A structure of the Network Description field in Table 10 is shown in Table 11:

TABLE 11

| Hotspots Virtualization | Reserved |
| --- | --- |

When the Hotspots Virtualization field is set to 1, it indicates that the operator uses the hotspot virtualization technology on the AP.

In this embodiment, step 301 to step 303 may be omitted, and the AP may directly send the indication message to the UE.

In this embodiment, the Network Description field may be added to the access network realm list NAI Realm List information element or core network realm list Core Network Realm List information element shown in Table 7 or Table 9 and sent to the UE, or may be sent as an independent information element to the UE.

Step 305: If the home operator of the UE uses the hotspot virtualization technology on the AP, the UE preferentially selects a network of the home operator of the UE to access a communications network by using the AP.

In this case, the UE considers the AP access service operator as the home operator of the UE, and therefore preferentially selects the network of the home operator to access the communications network by using the AP.

In this embodiment, an AP notifies, by adding network description information to an indication message sent to a UE, the UE whether a home operator of the UE uses a hotspot virtualization technology on the AP, so that in a case in which the home operator of the UE and the AP access service operator are different, the UE considers the AP access service operator as the home operator of the UE and therefore preferentially selects a network of the home operator to access a communications network by using the AP.

TABLE 10

| CN Realm Data Field Length | NAI Realm Encoding | NAI Realm Length | NAI Realm | Core Network Access Type | Core Network Operator Name | EAP Method Count | EAP Method #1 (optional) | ... | EAP Method #n (optional) | Network Description |
| --- | --- | --- | --- | --- | --- | --- | --- | --- | --- | --- |

Embodiment 4

Figure 4:
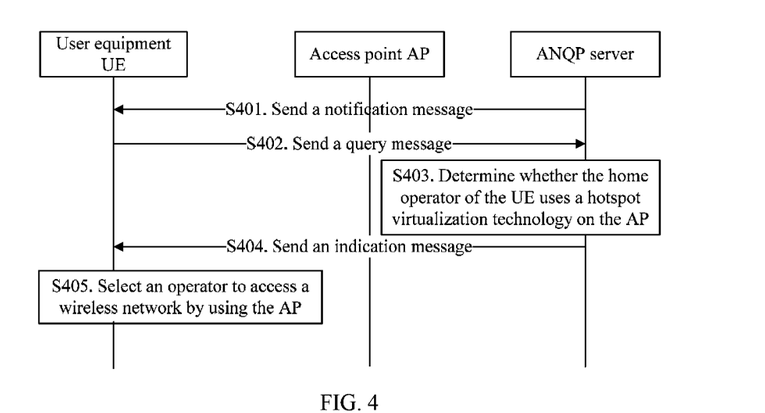
FIG. 4 is a flowchart of another method for notifying a wireless access point service virtual provider according to an embodiment of the present invention.

FIG. 4 shows a schematic flowchart of a method for notifying a wireless access point service virtual provider according to an embodiment of the present invention. As shown in FIG. 4, steps of Embodiment 4 are basically the same as those in Embodiment 3, and a difference lies in that: in Embodiment 4, after an AP receives a query message sent by a UE, the AP forwards the query message to an Access Network Query Protocol (Access Network Query Protocol, ANQP) server, and the ANQP server determines whether a home operator of the UE uses a hotspot virtualization technology on the AP, and sends an indication message to the UE by using the AP.

In this embodiment, an ANQP server notifies, by sending an indication message to a UE by using an AP and adding network description information to the indication message, the UE whether a home operator of the UE uses a hotspot virtualization technology on the AP, so that in a case in which the home operator of the UE and the AP access service operator are different, the UE considers the AP access service operator as the home operator of the UE and therefore preferentially selects a network of the home operator to access a communications network by using the AP.

Hereinafter, embodiments of the present invention provide apparatuses corresponding to the foregoing methods for notifying a wireless access point service virtual provider. It should be noted that, each functional unit included in the following apparatuses may perform corresponding steps in the foregoing methods, and therefore, functional units of the apparatuses are not described in detail in the following embodiments.

Embodiment 5

Figure 5:
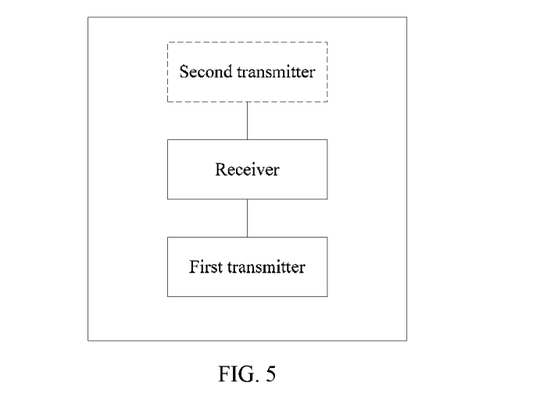
FIG. 5 is a structural diagram of an access point according to an embodiment of the invention.

As shown in FIG. 5, this embodiment of the present invention provides an access point AP, including:

a receiver, configured to receive a query message sent by a user equipment UE, where the query message carries an indication of information about a home operator of the UE; and a first transmitter, configured to send a response message to the UE, where the response message carries an indication of information about the AP access service operator, where if the home operator of the UE uses a hotspot virtualization technology on the AP, the information about the AP access service operator is the information about the home operator of the UE, so that the UE preferentially selects a network of the home operator to access a communications network by using the AP.

Further, the AP may further include a second transmitter, configured to send a notification message to the UE, where the notification message indicates that the AP is connected to networks of multiple operators.

Optionally, the notification message further indicates that, among the operators accessible by using the AP, at least one operator uses the hotspot virtualization technology on the AP.

Embodiment 6

Figure 6:
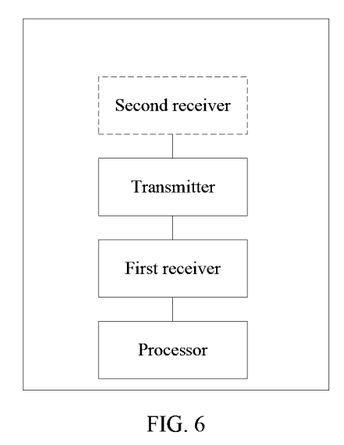
FIG. 6 is a structural diagram of a user equipment according to an embodiment of the present invention.

As shown in FIG. 6, this embodiment of the present invention provides a user equipment UE, including:

a transmitter, configured to send a query message to an access point AP, where the query message carries an indication of information about a home operator of the UE;

a first receiver, configured to receive a response message sent by the AP, where the response message carries an indication of information about the AP access service operator, where if the home operator of the UE uses a hotspot virtualization technology on the AP, the information about the AP access service operator is the information about the home operator of the UE; and a processor, configured to preferentially select a network of the home operator of the UE to access a communications network by using the AP.

Further, the UE may further include a second receiver, configured to receive a notification message sent by the AP, wherein the notification message indicates that the AP is connected to networks of multiple operators.

Optionally, the notification message further indicates that, among the operators accessible by using the AP, at least one operator uses the hotspot virtualization technology on the AP.

Embodiment 7

Figure 7:
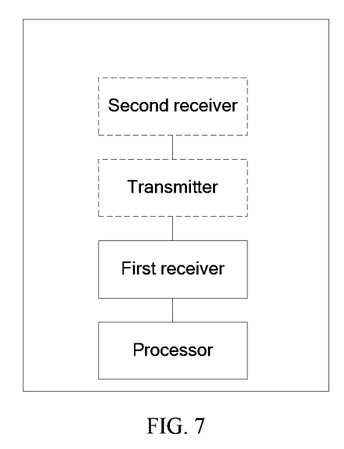
FIG. 7 is a structural diagram of another user equipment according to an embodiment of the present invention.

As shown in FIG. 7, this embodiment of the present invention provides a user equipment UE, including:

a first receiver, configured to receive an indication message sent by an access point AP, where the indication message indicates operators accessible by the UE by using the AP, and indicates whether the operators use a hotspot virtualization technology on the AP; and a processor, configured to preferentially select, when a home operator of the UE uses the hotspot virtualization technology on the AP, a network of the home operator of the UE to access a communications network by using the AP.

Further, the UE may further include a transmitter, configured to send a query message to the AP, where the query message is used to query the operators accessible by using the AP.

Still further, the UE may further include a second receiver, configured to receive a notification message sent by the AP, where the notification message indicates that the AP is connected to networks of multiple operators.

Optionally, the notification message further indicates that, among the operators accessible by using the AP, at least one operator uses the hotspot virtualization technology on the AP.

By using the access point and user equipment provided by the embodiments of the present invention, the UE notifies the AP of information about a home operator of the UE; and the AP determines whether the home operator of the UE uses a hotspot virtualization technology on the AP, and if the home operator uses the hotspot virtualization technology on the AP, sends the information about the home operator of the UE as information about the AP access service operator to the UE, so that in a case in which the home operator of the UE and the AP access service operator are different, the UE considers the AP access service operator as the home operator of the UE and therefore preferentially selects a network of the home operator to access a communications network by using the AP.

Based on the foregoing descriptions of the implementation manners, a person skilled in the art may clearly understand that the present invention may be implemented by software in addition to necessary universal hardware or by hardware only. In most circumstances, the former is a preferred implementation manner. Based on such an understanding, the technical solutions of the present invention essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An access point (AP), comprising:
   a receiver, configured to receive a query message sent by a user equipment (UE), wherein the query message carries information about a home operator of the UE;
   a first transmitter, configured to send a response message to the UE, wherein the response message carries information about an AP access service operator, wherein when the home operator of the UE uses a hotspot virtualization technology on the AP, the information about the AP access service operator is the information about the home operator of the UE, to enable the UE to select a network of the home operator to access a communications network using the AP; and
   a second transmitter, configured to send a notification message to the UE, wherein the notification message indicates that the AP is connected to networks of multiple operators, wherein the notification message further includes an indication that, among the operators accessible by the AP, at least one operator uses the hotspot virtualization technology on the AP, wherein the indication includes a virtualization technology indication field in a beacon frame or a probe response frame.

2. A user equipment (UE), comprising:
   a transmitter, configured to send a query message to an access point (AP), wherein the query message carries information about a home operator of the UE;
   a first receiver, configured to receive a response message sent by the AP, wherein the response message carries information about an AP access service operator, wherein when the home operator of the UE uses a hotspot virtualization technology on the AP, the information about the AP access service operator is the information about the home operator of the UE;
   a second receiver, configured to receive a notification message sent by the AP, wherein the notification message indicates that the AP is connected to networks of multiple operators, wherein the notification message includes an indication that, among the operators accessible by using the AP, at least one operator uses the hotspot virtualization technology on the AP, wherein the indication includes a virtualization technology indication field in a beacon frame or a probe response frame; and
   a processor, configured to select a network of the home operator of the UE to access a communications network using the AP.

3. A user equipment (UE), comprising:
   a first receiver, configured to receive an indication message sent by an access point (AP), wherein the indication message indicates operators accessible by the UE using the AP;
   a transmitter, configured to send a query message to the AP, wherein the query message is used to query the operators accessible by the AP;
   a second receiver, configured to receive a notification message sent by the AP, wherein the notification message includes an indication that, among the operators accessible using the AP, at least one operator uses the hotspot virtualization technology on the AP, wherein the indication includes a virtualization technology indication field in a beacon frame or a probe response frame; and
   a processor, configured to select, when a home operator of the UE uses the hotspot virtualization technology on the AP, a network of the home operator of the UE to access a communications network using the AP.

4. A method for notifying a wireless access point service virtual provider, comprising:
   receiving, by a user equipment (UE), a notification message sent by an access point (AP), wherein the notification message indicates that the AP is connected to networks of multiple operators, and wherein the notification message further includes an indication that, among the operators accessible by the AP, at least one operator uses the hotspot virtualization technology on the AP, wherein the indication is implemented by adding a virtualization technology indication field to a beacon frame or a probe response frame;
   sending, by the UE, a query message to the AP, wherein the query message carries information about a home operator of the UE;
   receiving, by the UE, a response message sent by the AP, wherein the response message carries information about the AP access service operator, wherein when the home operator of the UE uses a hotspot virtualization technology on the AP, the information about the AP access service operator is the information about the home operator of the UE; and
   selecting, by the UE, a network of the home operator to access a communications network using the AP.

* * * * *